(12) United States Patent
Chiu

(10) Patent No.: US 8,371,786 B2
(45) Date of Patent: Feb. 12, 2013

(54) QUICK-POSITIONING CAPTIVE SCREW

(75) Inventor: Ming-Chung Chiu, Keelung (TW)

(73) Assignee: Hanwit Precision Industries Ltd., Sijhih, Taipei County (TW)

( * ) Notice: Subject to any disclaimer, the term of this patent is extended or adjusted under 35 U.S.C. 154(b) by 254 days.

(21) Appl. No.: 12/982,291

(22) Filed: Dec. 30, 2010

(65) Prior Publication Data
US 2012/0170993 A1 Jul. 5, 2012

(51) Int. Cl.
*F16B 21/18* (2006.01)
(52) U.S. Cl. .................................. 411/353; 411/551
(58) Field of Classification Search .............. 411/350, 411/351, 347, 353, 550–552
See application file for complete search history.

(56) References Cited

U.S. PATENT DOCUMENTS

| 1,542,467 | A | * | 6/1925 | Moratta | 411/350 |
| 3,817,267 | A | * | 6/1974 | Hicks et al. | 137/204 |
| 4,145,800 | A | * | 3/1979 | Scholz et al. | 29/402.15 |
| 2003/0156923 | A1 | * | 8/2003 | Winkler et al. | 411/552 |

* cited by examiner

*Primary Examiner* — Gary Estremsky
(74) *Attorney, Agent, or Firm* — Muncy, Geissler, Olds & Lowe, PLLC

(57) ABSTRACT

A quick-positioning captive screw includes a mounting base member having an outer thread spirally extending around the peripheral wall of a top flange thereof, the outer thread having a leading end terminating in the top edge of the top flange and a tail end terminating in the bottom edge of the top flange and cutting a part of the top flange into a rib, a lock screw having an inner thread located on the inside wall of a plastic cap thereof for threading through the outer thread into the space around the periphery of the mounting base member below the bottom edge of the top flange after bonding of the mounting base member to an external panel frame by reflow soldering, and a spring member sleeved onto the threaded shank of the screw bolt of the lock screw and stopped between the head of the screw bolt and the inside step of the mounting base member.

6 Claims, 10 Drawing Sheets

QUICK-POSITIONING CAPTIVE SCREW

BACKGROUND OF THE INVENTION

1. Field of the Invention

The present invention relates to fastener means for joining two metal panel frames and more particularly, to a quick-positioning captive screw, which consists of a mounting base member, a lock screw and a spring member, wherein the mounting base member has an outer thread extending around the periphery of the top flange thereof for the threading of an inner thread of the plastic cap of the lock screw to guide an inside stop edge of the plastic cap of the lock screw over the top flange into the space) member below the bottom edge of the top flange of the mounting base member.

2. Description of the Related Art

The power drive or speed-adjustment unit of a machine tool generally has a panel frame detachably attached to the casing thereof. This panel frame may be fastened to the casing by screw members. However, the screw members may fall from the panel frame and missed accidentally during dismounting due to user's negligence, affecting further re-installation operation. To avoid this problem, a captive crew formed of a knob, a barrel and a screw is created. During installation, the barrel is affixed to a mounting through hole on the panel frame, and then the knob is rotated to drive the screw into a mounting screw hole on the casing of the power drive or speed-adjustment unit of the machine tool. After disconnection of the screw from the mounting screw hole on the casing of the power drive or speed-adjustment unit of the machine tool for allowing removal of the panel frame from the casing of the power drive or speed-adjustment unit of the machine tool, the captive screw is kept secured to the panel frame, avoiding missing the component parts.

FIGS. 9 and 10 illustrate a captive screw D according to the prior art design. According to this design, the captive screw D comprises a cap A, a screw member A1 mounted in the cap A, a barrel C coupled to the cap A and a spring member B sleeved onto the screw member A1 and stopped between a head A11 of the screw member A1 and a part inside the barrel C. The cap A has a bottom coupling flange A2. The barrel C has a top coupling flange C1 that is movable with the barrel C relative to the screw member A1 between the head A11 of the screw member A1 and the bottom coupling flange A2 of the cap A, and a bottom mounting portion C2 bonded to a mounting through hole on a metal panel frame E. During installation, a hand tool is used to drive the screw member A1 into a mounting screw hole on the casing E1 of the power drive or speed-adjustment unit of a machine tool. Thus, the fastener is secured to the metal plate member E, and therefore the metal panel frame E is affixed to the casing E1.

According to the aforesaid prior art design, the cap A and barrel C of the captive screw D are rigid metal members, and the outer diameter of the head A11 of the screw member A1 and the outer diameter of the top coupling flange C1 of the barrel C are greater than the inner diameter of the bottom coupling flange A2 of the cap A. When installing the screw member A1 and the barrel C in the cap A, a high pressure must be employed to have the head A11 of the screw member A1 be affixed to the inside of the cap A and the top coupling flange C1 of the barrel C be forced over the bottom coupling flange A2 of the cap A into the inside of the cap A. This installation method is difficult to achieve. Further, the top coupling flange C1 of the barrel C or the bottom coupling flange A2 of the cap A may be forced to deform or to break during installation by pressure. If the top coupling flange C1 of the barrel C or the bottom coupling flange A2 of the cap A is damaged, the bottom coupling flange A2 of the cap A may not be accurately coupled to the top coupling flange C1 of the barrel C, and the cap A and the spring member B may fall from the barrel C accidentally.

Further, when forcing the top coupling flange C1 of the barrel C over the bottom coupling flange A2 of the cap A into the inside of the cap A, the applied pressure may be transferred to the barrel C against the metal panel frame E, causing the junction between the barrel C and the metal panel frame E to break.

Therefore, an improvement in this regard is necessary.

SUMMARY OF THE INVENTION

The present invention has been accomplished under the circumstances in view. It is therefore the main object of the present invention to provide a quick-positioning captive fastener, which facilitates quick installation, avoiding structural damage during installation.

To achieve this and other objects of the present invention, a quick-positioning captive screw comprises a mounting base member, a lock screw and a spring member. The mounting base member has an outer thread spirally extending around the peripheral wall of the top flange thereof. The lock screw comprises a screw bolt, and a plastic cap molded on the head of the screw bolt. The plastic cap has an inner thread on the inside wall near the bottom side. The outer thread has its tail end extending upwardly (outwardly) into the peripheral wall of the top flange of the mounting base member to cut a part of the peripheral wall of the top flange into a rib between the tail end and the bottom edge of the peripheral wall of the top flange.

The outer thread of the mounting base member is adapted for the threading of an inner thread of the plastic cap of the lock screw to guide the inside stop edge of the plastic cap of the lock screw over the top flange into the space around the periphery of the cylindrical body of the mounting base member below the bottom edge of the top flange of the mounting base member. After coupling of the inner thread of the plastic cap to the periphery of the cylindrical body of the mounting base member, the inner thread cannot pass over the rib into the tail end of the outer thread, and therefore the inner thread of the plastic cap is kept floating around the periphery of the cylindrical body of the mounting base member between the top flange and bottom flange of the mounting base member, prohibiting falling of the lock screw and the spring member out of the mounting base member.

DETAILED DESCRIPTION OF THE PREFERRED EMBODIMENT

Figure 1:
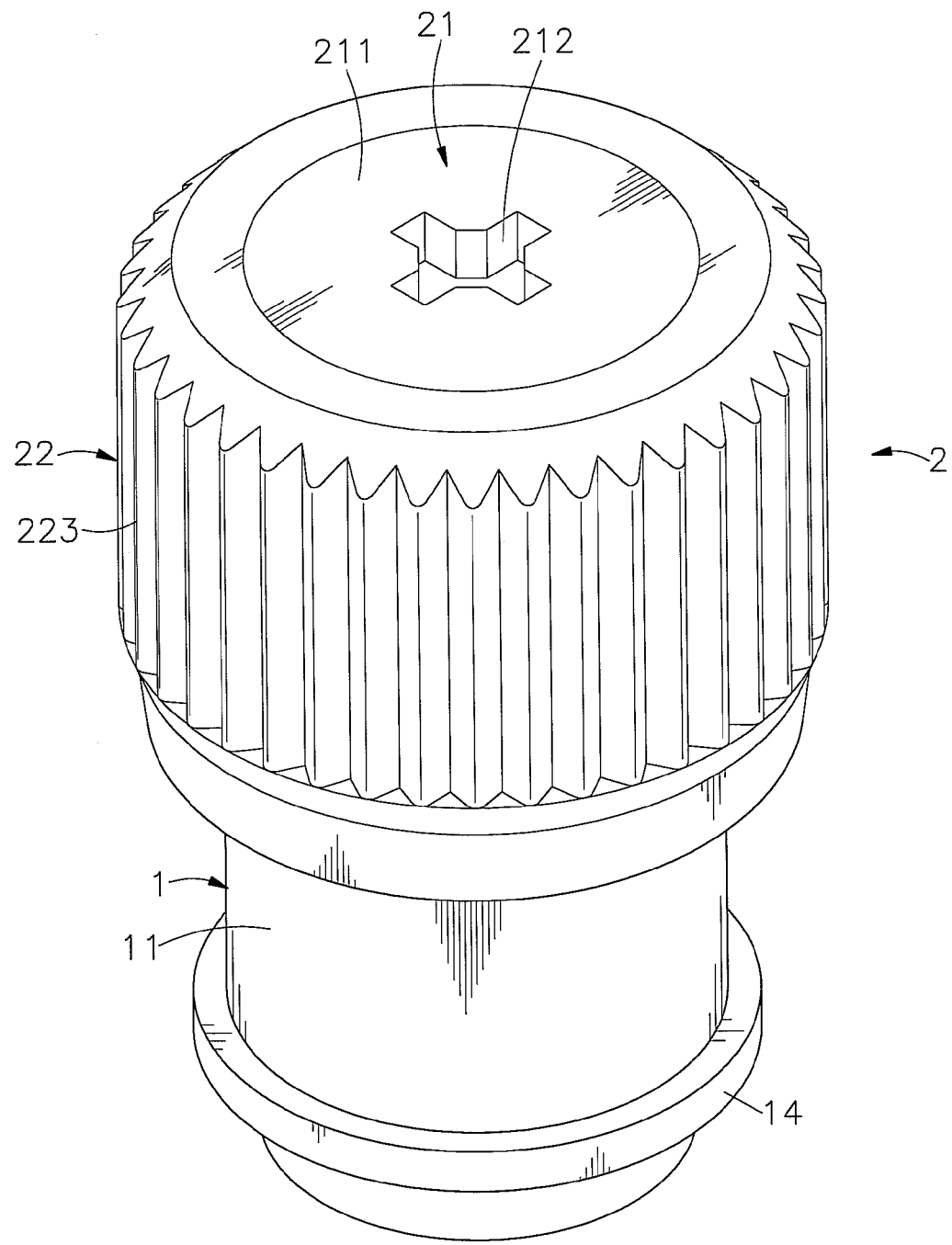
FIG. 1 is an oblique top elevational view of a quick-positioning captive screw in accordance with the present invention.
Figure 2:
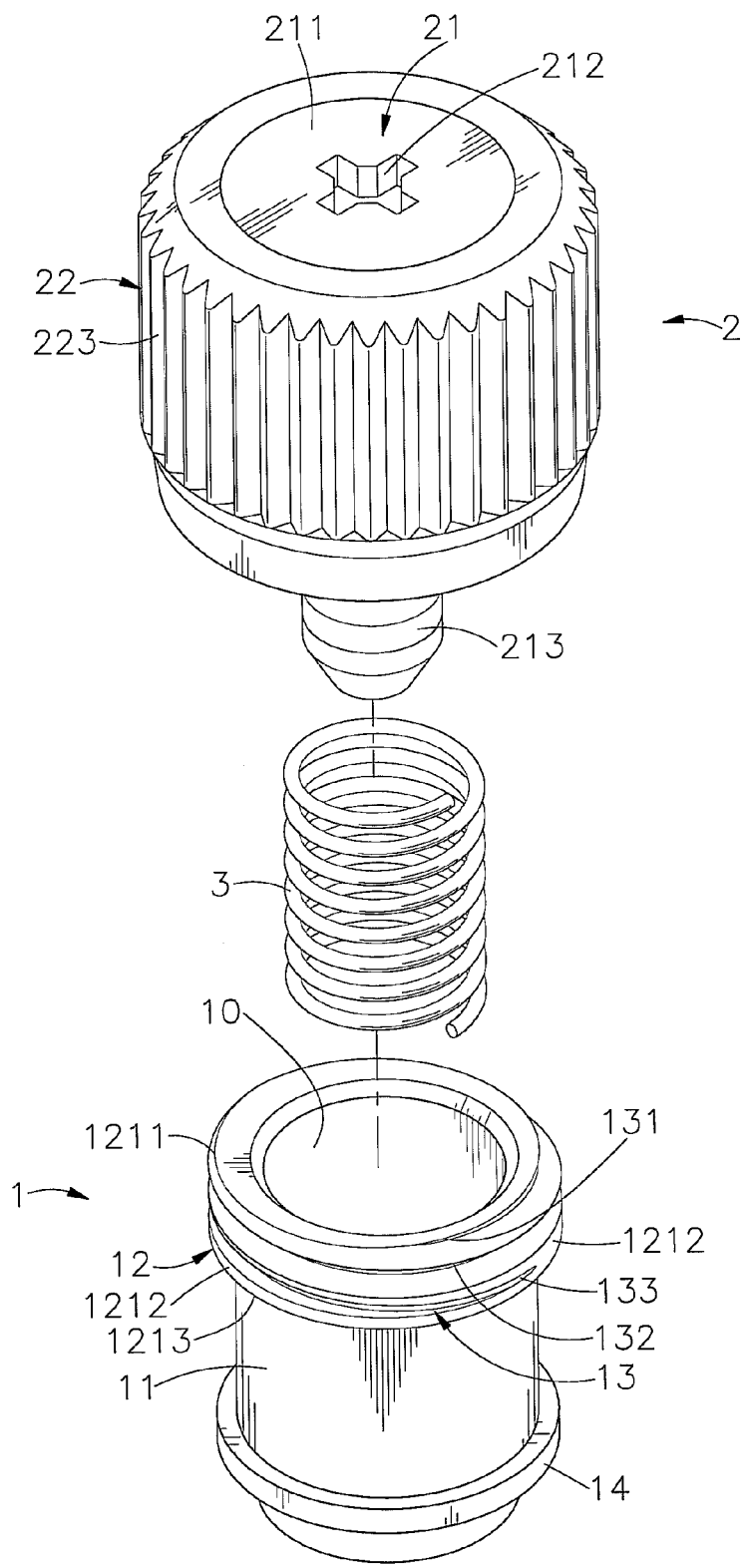
FIG. 2 is an exploded view of the quick-positioning captive screw in accordance with the first embodiment of the present invention.
Figure 3:
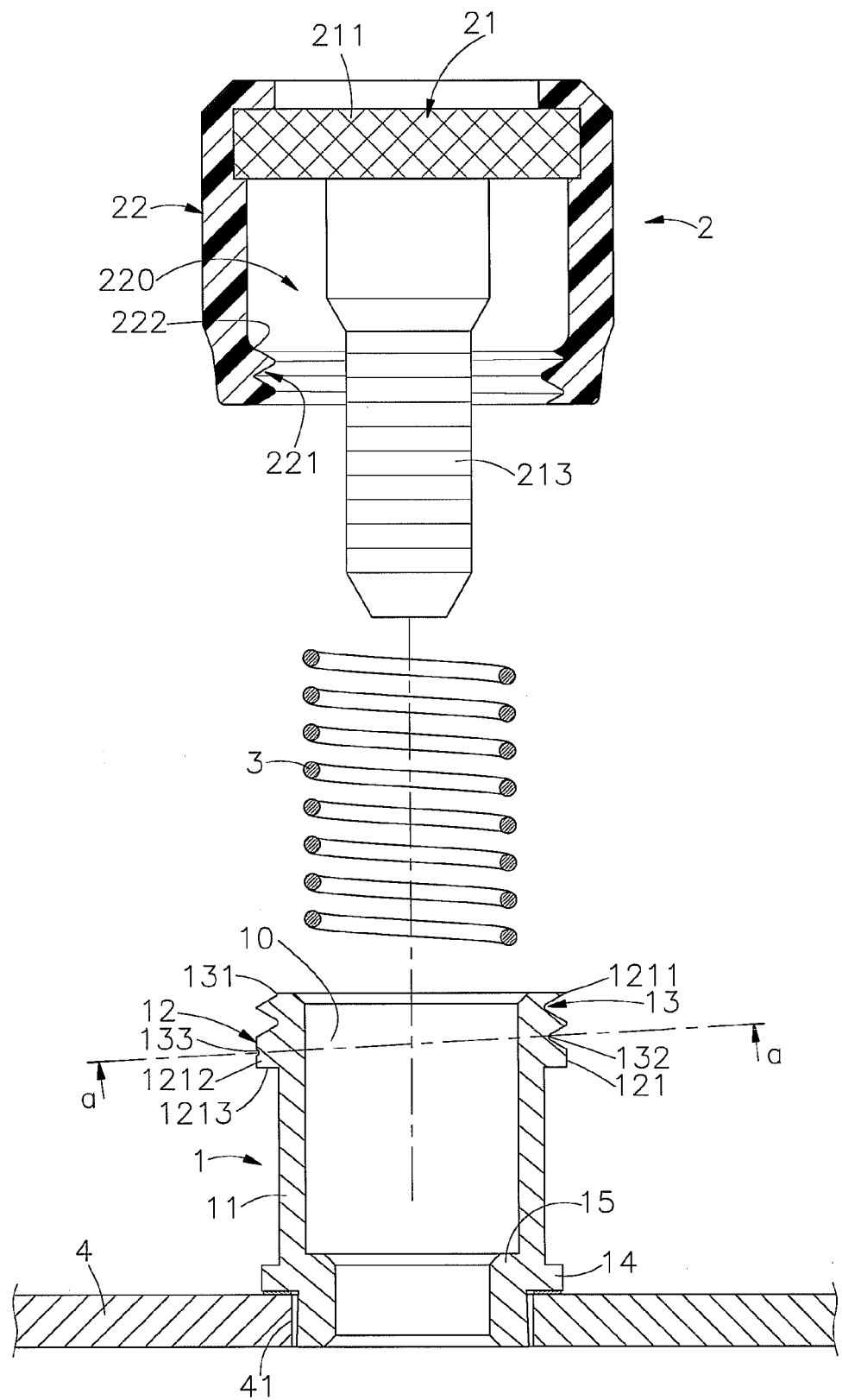
FIG. 3 is a sectional exploded view of the quick-positioning captive screw in accordance with the present invention after installation of the mounting base member in a mounting through hole on a first panel frame.
Figure 4:
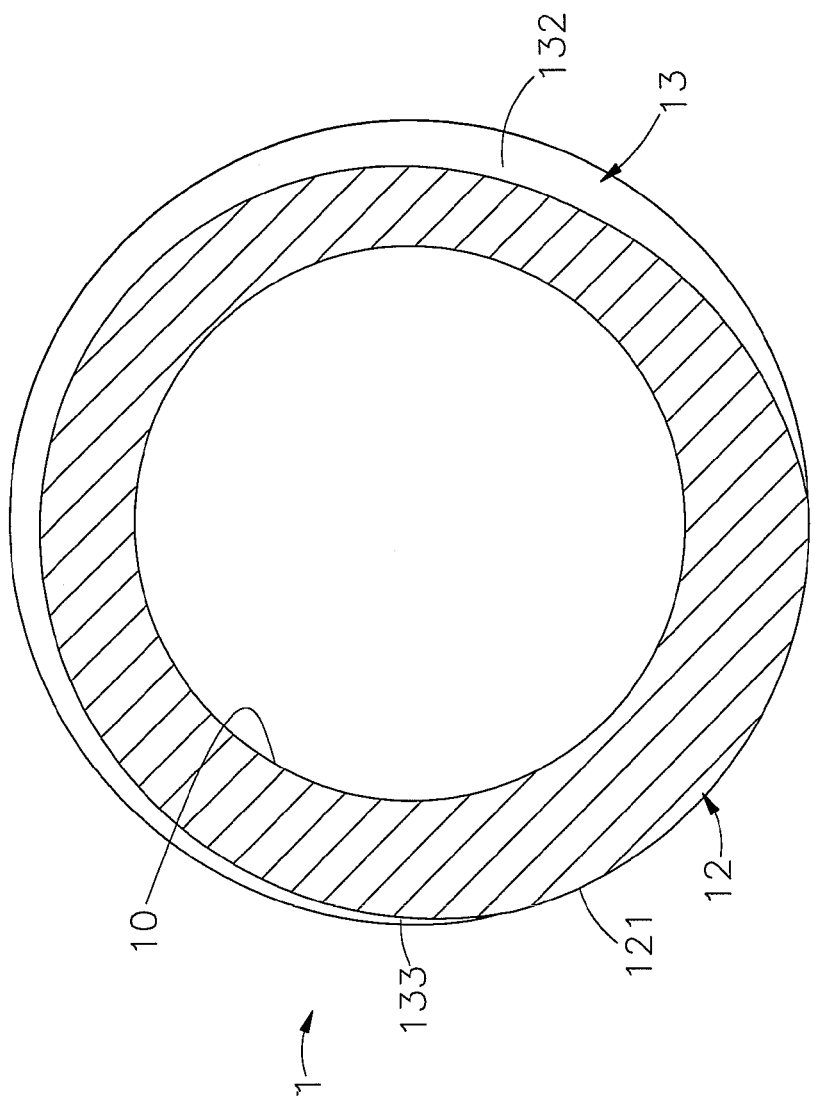
FIG. 4 is a sectional view, in an enlarged scale, taken along line a-a of FIG. 3.

Referring to FIGS. 1-4, a quick-positioning captive screw in accordance with the present invention is shown comprising a mounting base member 1, a lock screw 2 and a spring member 3.

The mounting base member 1 comprises a cylindrical body 11 defining an axial hole 10, a top flange 12 extending around the periphery of the cylindrical body 11 at the top side, a bottom flange 14 extending around the periphery of the cylindrical body 11 near but spaced above the reduced bottom end of the cylindrical body 11, and an inside step 15 extending around the inside wall of the cylindrical body 11 corresponding to the bottom flange 14. The top flange 12 has a peripheral wall 121, a top edge 1211 located on the top side of the peripheral wall 121 and a bottom edge 1213 located on the bottom side of the peripheral wall 121 and perpendicularly connected to the periphery of the cylindrical body 11. The mounting base member 1 further comprises an outer thread 13 spirally extending around the peripheral wall 121. The outer thread 13 has a leading end 131 terminating in the top edge 1211 of the peripheral wall 121 of the top flange 12, a tail end 133 terminating in the bottom edge 1213 of the peripheral wall 121 of the top flange 12, and a series of thread turns 132 connected between the leading end 131 and the tail end 133 and spirally extending around the peripheral wall 121 of the top flange 12. Further, the tail end 133 cuts a part of the peripheral wall 121 of the top flange 12 into a rib 1212 between the tail end 133 and the bottom edge 1213.

The lock screw 2 comprises a screw bolt 21 and a plastic cap 22. The screw bolt 21 has a head 211, a tool groove 212 located on the top wall of the head 211, and a threaded shank 213 perpendicularly downwardly extended from the bottom wall of the head 211 at the center. The plastic cap 22 is a plastic member affixed to the head 211 of the screw bolt 21 and defining therein an accommodation space 220 around an upper part of the threaded shank 213, an inner thread 221 spirally extending around the inside wall near the bottom edge thereof, an inside stop edge 222 disposed in the accommodation space 220 near the bottom side and above the elevation of the inner thread 221, and a non-slip tooth pattern 223 located on the peripheral wall therefore for better grip.

The spring member 3 is sleeved onto the threaded shank 213 of the screw bolt 21, having its one end stopped against the bottom wall of the head 211 of the screw bolt 21 and its other end thereof inserted into the axial hole 10 of the cylindrical body 11 of the mounting base member 1 and stopped against the inside step 15 of the cylindrical body 11.

Further, the screw bolt 21 is made of metal, and the plastic cap 22 is a plastic member directly molded on the head 211 of the screw bolt 21 by over-molding technology. Further, the plastic cap 22 can be made of damp-proof and anti-corrosion plastics in any of a variety of colors or color designs. Further, because the plastic cap 22 is directly molded on the head 211 of the screw bolt 21 by over-molding technology, no further secondary processing process is needed.

When installing the quick-positioning lock captive screw in a first panel frame 4, an automatic mechanical mechanism (not shown) is used to pick up the mounting base member 1 and then to insert the bottom end of the mounting base member 1 into a mounting through hole 41 on the first panel frame 4, enabling the bottom flange 14 of the cylindrical body 11 to be stopped at the top wall of the first panel frame 4, and a reflow soldering process is employed to bond the then bottom flange 14 of the cylindrical body 11 to the first panel frame 4 with a solder paste.

Figure 5:
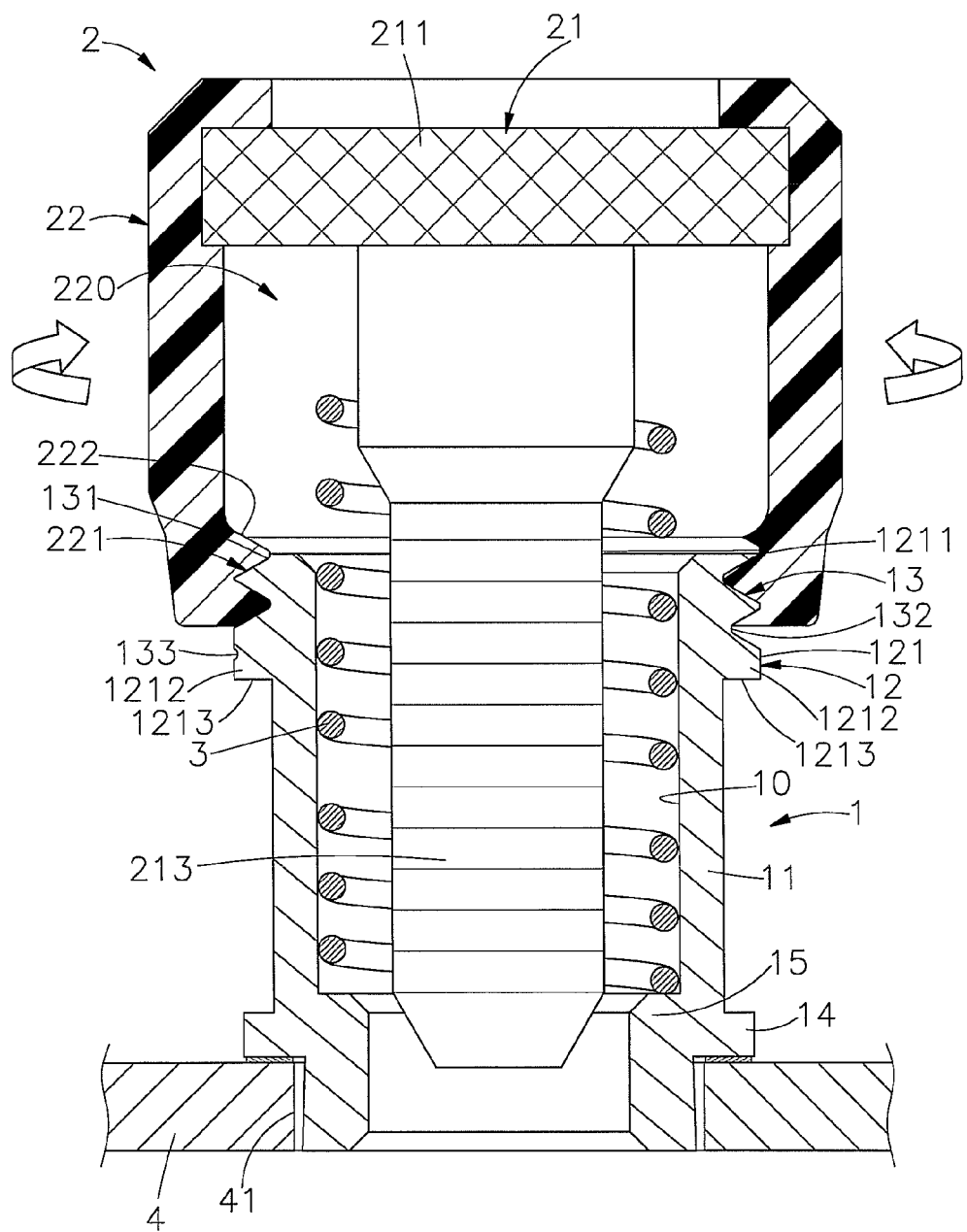
FIG. 5 is a schematic sectional side view of the present invention, illustrating the installation of the lock screw and the spring member in the mounting base member at the first panel frame (I).
Figure 6:
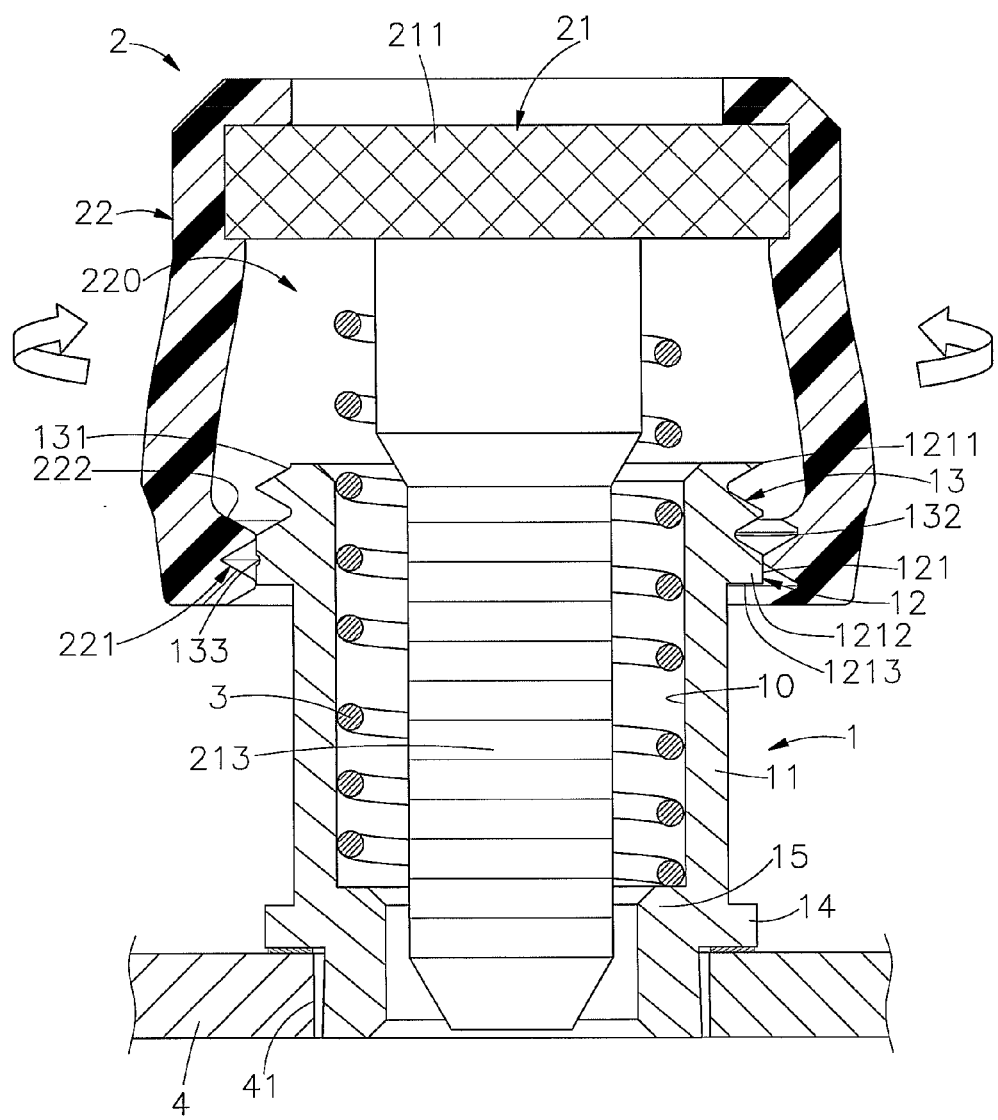
FIG. 6 is a schematic sectional side view of the present invention, illustrating the installation of the lock screw and the spring member in the mounting base member at the first panel frame (II).
Figure 7:
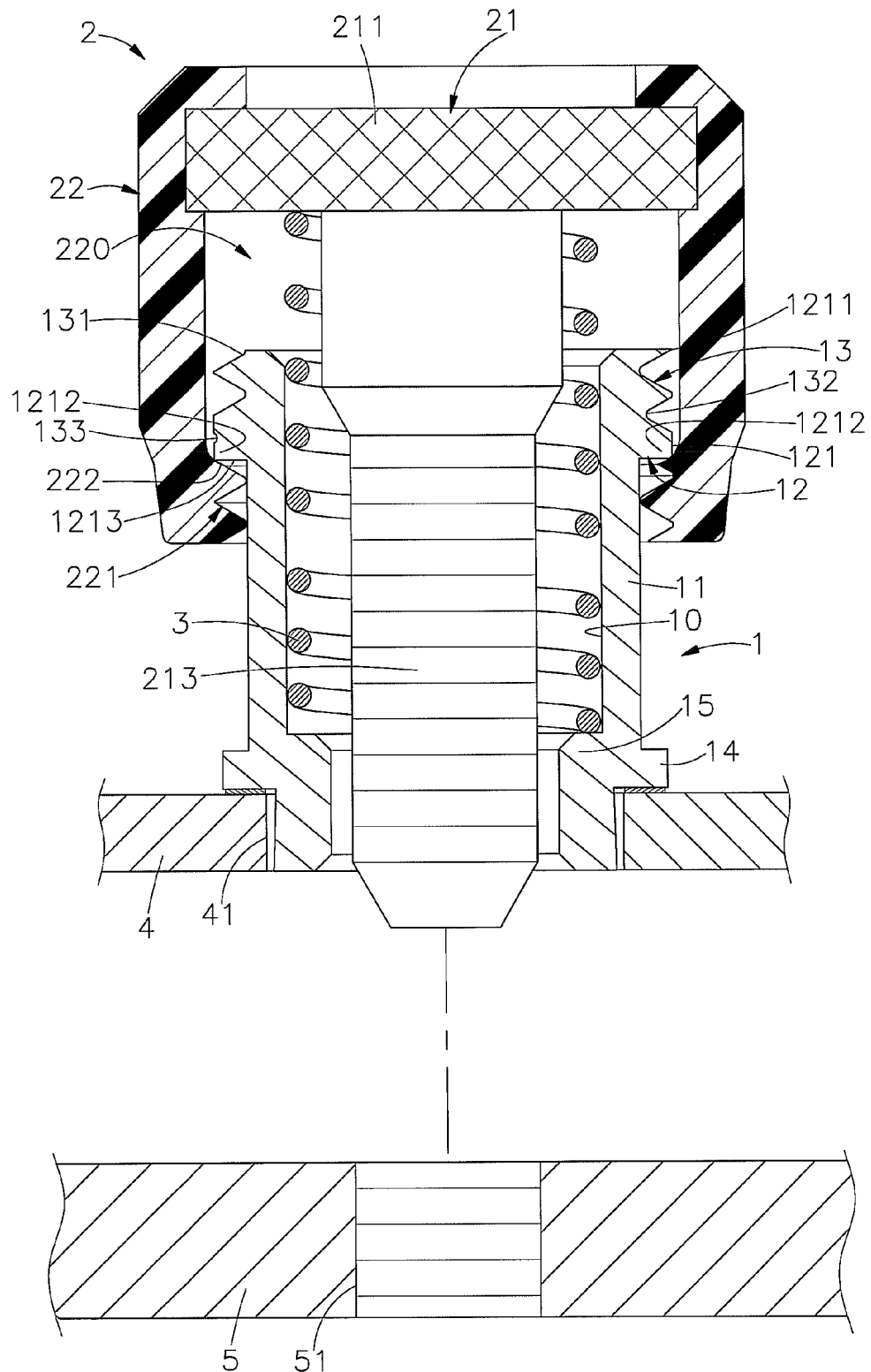
FIG. 7 is a schematic sectional side view of the present invention, illustrating the fixation of the quick-positioning captive screw with the first panel frame to a second panel frame.

Referring to FIGS. 5-7 and FIG. 4 again, after bonding of the mounting base member 1 to the first panel frame 4, sleeve the spring member 3 onto the threaded shank 213 of the screw bolt 21 of the lock screw 2, and then rotate the plastic cap 22 of the lock screw 2 to thread the inner thread 221 of the plastic cap 22 onto the outer thread 13 at the top flange 12 of the cylindrical body 11 of the mounting base member 1. At this time, the inner thread 221 is moved spirally through the leading end 131 into the thread turns 132 toward the tail end 133. Because the tail end 133 extends upwardly (outwardly) into the peripheral wall 121 of the top flange 12 of the mounting base member 1, the inner thread 221 will be stopped in place after a minor axial displacement when reaches the tail end 133. At this time, the user cannot rotate the plastic cap 22 of the lock screw 2 forwards relative to the mounting base member 1 with the fingers. Thus, the user can attach a hand tool, for example, a screwdriver to the tool groove 212 of the screw bolt 21 and then rotate the screwdriver to drive the inner thread 221 out of the tail end 133 into the peripheral wall 121 of the top flange 12 of the mounting base member 1. At this time, the material property of the plastic material of the plastic cap 22 enables the inner thread 221 to be forced to expand its inner diameter and to further move downwardly over the rib 1212 to the space around the periphery of the cylindrical body 11 and below the bottom edge 1213 of the top flange 12. When the inner thread 221 passed over the bottom edge 1213 of the top flange 12, the plastic cap 22 immediately returns to its former shape to have the inside stop edge 222 be stopped at the bottom side of the bottom edge 1213 of the top flange 12 subject to the effect of the spring force of the spring member 3.

Figure 8:
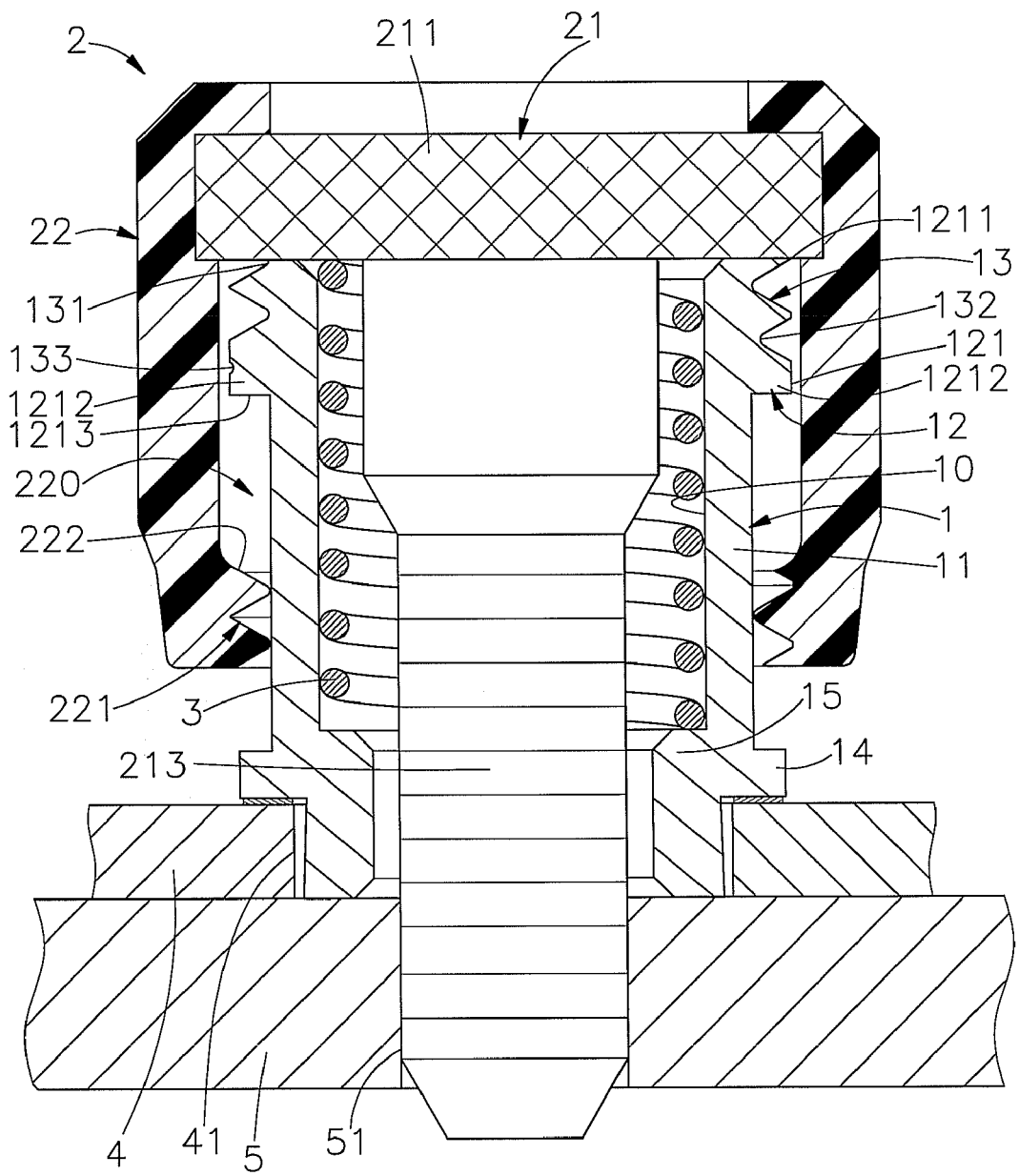
FIG. 8 corresponds to FIG. 7, illustrating the quick-positioning captive screw fastened the second panel frame.
Figure 9:
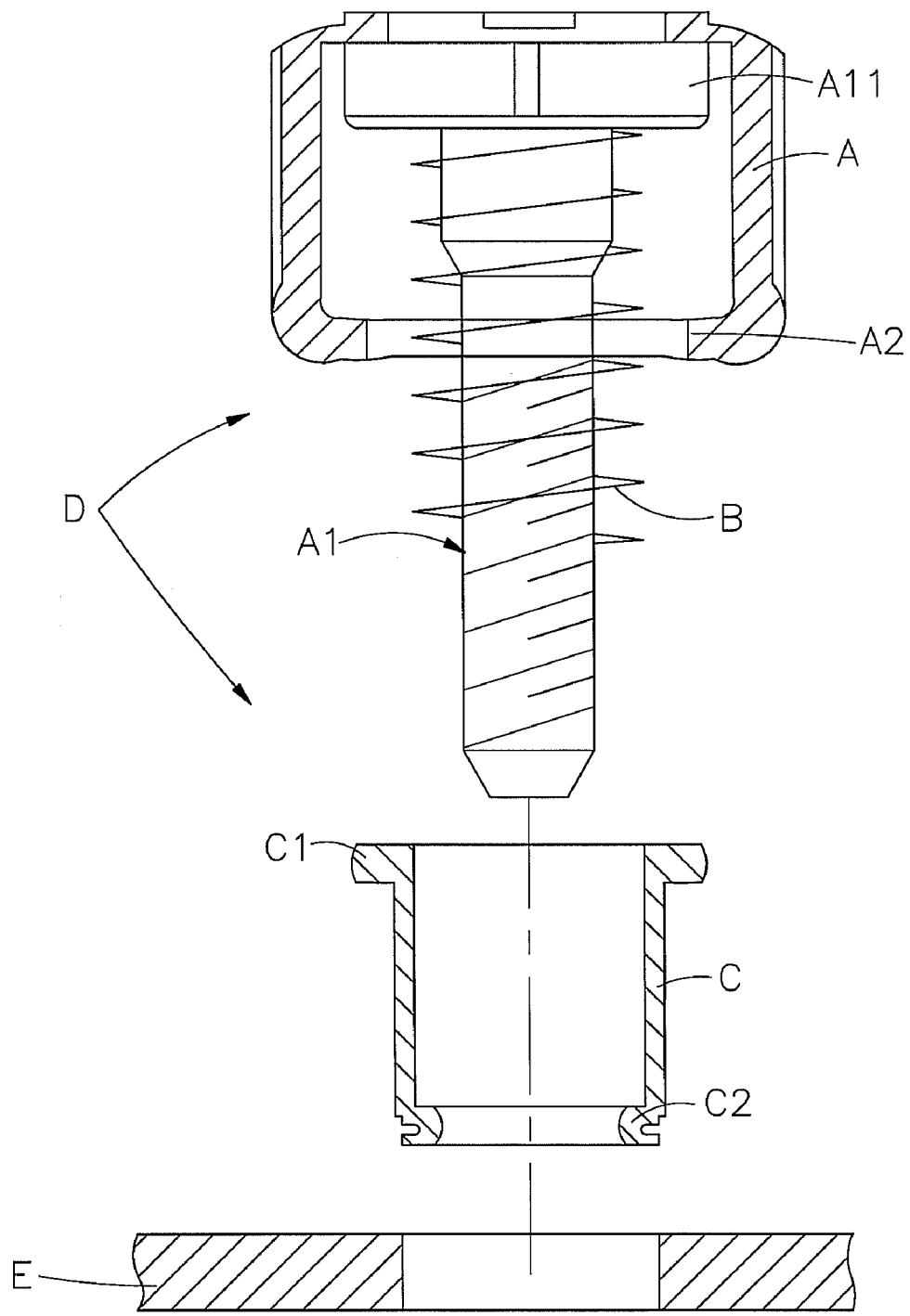
FIG. 9 is a sectional exploded view of a captive screw according to the prior art.
Figure 10:
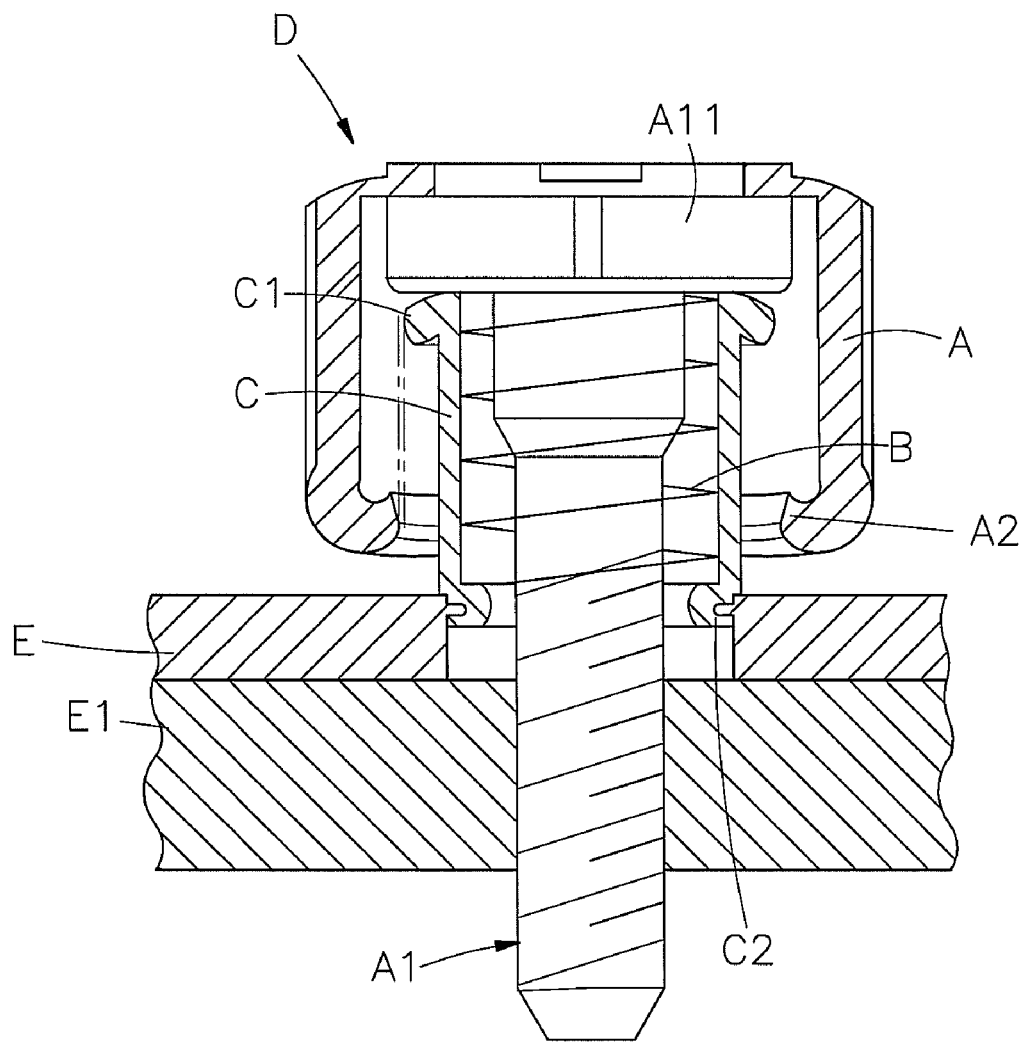
FIG. 10 is a sectional view illustrating the prior art captive screw affixed to a first panel frame and a second panel frame.

Referring to FIG. 8 and FIG. 7 again, when the first panel frame 4 is attached to a second panel frame 5 to keep the mounting through hole 41 in alignment with a mounting screw hole 51 on the second panel frame 5, force the lock screw 2 downwards to compress the spring member 3 and rotate the plastic cap 22 of the lock screw 2 to drive the threaded shank 213 into the mounting screw hole 51 of the second panel frame 5, and then attach a hand tool (for example, screwdriver) to the tool groove 212 of the head 211 of the screw bolt 21 and rotate the hand tool to fasten tight the lock screw 2. Thus, the first panel frame 4 and the second panel frame 5 are locked together.

At this time, the threaded shank 213 of the screw bolt 21 is fastened to the mounting screw hole 51 of the second panel frame 5, the plastic cap 22 surrounds the mounting base member 1, and the spring member 3 is compressed and received inside the cylindrical body 11 of the mounting base member 1.

When wishing to dismount the first panel frame 4 from the second panel frame 5, attach the hand tool (screwdriver) to the tool groove 212 of the head 211 of the screw bolt 21 again and rotate the hand tool in the reversed direction to disengage the threaded shank 213 of the screw bolt 21 of the lock screw 2 from the mounting screw hole 51 of the second panel frame 5, allowing removal of the first panel frame 4 from the second panel frame 5. After disengagement of the threaded shank 213 of the screw bolt 21 of the lock screw 2 from the mounting screw hole 51 of the second panel frame 5, the spring member 3 is released from the constraint and immediately returns to its former shape to force the lock screw 2 axially outwardly relative to the mounting base member 1 (see FIG. 7). At this time, the inside stop edge 222 of the plastic cap 22 is forced to stop at the bottom side of the bottom edge 1213 of the top flange 12 subject to the effect of the spring force of the spring member 3, avoiding falling of the lock screw 2 from the mounting base member 1. Further, because the tail end 133 of the outer thread 13 terminates into the peripheral wall 121 of the top flange 12 of the mounting base member 1 and the inner diameter of the inner thread 221 of the plastic cap 22 is smaller than the outer diameter of the outer thread 13, the inner thread 221 cannot pass over the rib 1212 into the tail end 133 of the outer thread 13, and therefore the inner thread 221 of the plastic cap 22 is kept floating around the periphery of the cylindrical body 11 of the mounting base member 1 between the top flange 12 and the bottom flange 14, prohibiting falling of the lock screw 2 and the spring member 3 out of the mounting base member 1.

By means of bonding the mounting base member 1 to the mounting through hole 41 of the first panel frame 4 by reflow soldering before installation of the lock screw 2 and the spring member 3, the plastic cap 22 and the spring member 3 will not be damaged by heat during the reflow soldering process, and therefore the structural strength of plastic cap 22 and the spring member 3 is maintained intact.

In conclusion, the main feature of the present invention is the design of the outer thread 13 on the peripheral wall 121 of the top flange 12 of the mounting base member 1 and the design of the inner thread 221 on the inside wall of the plastic cap 22 of the lock screw 2. The outer thread 13 has its tail end 133 extending upwardly (outwardly) into the peripheral wall 121 of the top flange 12 of the mounting base member 1 to cut a part of the peripheral wall 121 of the top flange 12 into a rib 1212 between the tail end 133 and the bottom edge 1213 of the peripheral wall 121 of the top flange 12. After coupling of the inner thread 221 of the plastic cap 22 to the periphery of the cylindrical body 11 of the mounting base member 1, the inner thread 221 cannot pass over the rib 1212 into the tail end 133 of the outer thread 13, and therefore the inner thread 221 of the plastic cap 22 is kept floating around the periphery of the cylindrical body 11 of the mounting base member 1 between the top flange 12 and the bottom flange 14, prohibiting falling of the lock screw 2 and the spring member 3 out of the mounting base member 1.

A prototype of quick-positioning captive screw has been constructed with the features of FIGS. 1-8. The quick-positioning captive screw functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A quick-positioning captive screw, comprising:
a mounting base member for bonding to a mounting through hole of a first panel frame, said mounting base member comprising a cylindrical body defining an axial hole, a top flange extending around the periphery of said cylindrical body at a top side, a bottom flange extending around the periphery of said cylindrical body near a bottom end of said cylindrical body, and an inside step extending around an inside wall of said cylindrical body corresponding to said bottom flange, said top flange having a peripheral wall, a top edge located on a top side of said peripheral wall and a bottom edge located on a bottom side of said peripheral wall, and an outer thread spirally extending around said peripheral wall, said outer thread having a leading end terminating in the top edge of said peripheral wall of said top flange, a tail end terminating in the bottom edge of said peripheral wall of said top flange, and a series of thread turns connected between said leading end and said tail end and spirally extending around said peripheral wall of said top flange, said tail end cutting a part of said peripheral wall of said top flange into a rib between said tail end and said bottom edge;
a lock screw coupled to said mounting base member for fastening to a mounting screw hole on a second panel frame to lock said first panel frame to said second panel frame, said lock screw comprising a screw bolt and a plastic cap, said screw bolt comprising a head and a threaded shank perpendicularly downwardly extended from a bottom wall of said head, said plastic cap being affixed to said head of said screw bolt and defining therein an accommodation space around an upper part of said threaded shank, an inner thread spirally extending around an inside wall near a bottom edge thereof and an inside stop edge disposed in said accommodation space near a bottom side and above the elevation of said inner thread; and
a spring member sleeved onto said threaded shank of said screw bolt and stopped between said head of said screw bolt of said lock screw and said inside step of said cylindrical body of said mounting base member.

2. The quick-positioning captive screw as claimed in claim 1, wherein said plastic cap comprises a non-slip tooth pattern located on the periphery therefore.

3. The quick-positioning captive screw as claimed in claim 1, wherein said head of said screw bolt is fixedly mounted in said plastic cap, having a tool groove located on a top wall thereof and exposed to the outside of said plastic cap.

4. The quick-positioning captive screw as claimed in claim 1, wherein said bottom flange of said mounting base member is soldered to said second panel frame around said mounting screw hole.

5. The quick-positioning captive screw as claimed in claim 1, wherein said plastic cap is directly molded onto said head of said screw bolt.

6. The quick-positioning captive screw as claimed in claim 1, wherein said bottom edge of said top flange is perpendicularly connected to the periphery of said cylindrical body.

* * * * *